United States Patent [19]

Jacobs

[11] Patent Number: 4,869,456
[45] Date of Patent: Sep. 26, 1989

[54] LOAD SUPPORTING PAD

[75] Inventor: Sheldon L. Jacobs, La Palma, Calif.

[73] Assignee: Carson Industries, Inc., La Verne, Calif.

[21] Appl. No.: 120,941

[22] Filed: Nov. 16, 1987

[51] Int. Cl.⁴ ............................................. F16M 13/00
[52] U.S. Cl. .................................... 248/678; 108/51.1; 108/901; 248/346
[58] Field of Search ........................ 248/678, 679, 346; 108/51.1, 51.3, 901, 902

[56] References Cited

U.S. PATENT DOCUMENTS

| | | | |
|---|---|---|---|
| 3,557,512 | 1/1971 | Braeuninger et al. | 108/51.1 X |
| 3,580,190 | 5/1971 | Fowler | 108/51.1 |
| 3,938,448 | 2/1976 | Nishitani et al. | 108/51.1 |
| 4,189,125 | 2/1980 | Little | 108/901 X |
| 4,212,446 | 7/1980 | Domanick et al. | 248/346 X |
| 4,331,360 | 5/1982 | Roudybush et al. | 108/901 X |
| 4,393,999 | 7/1983 | Forshee | 108/901 X |

Primary Examiner—Ramon S. Britts
Assistant Examiner—David L. Talbott
Attorney, Agent, or Firm—Spensly Horn Jubas & Lubitz

[57] ABSTRACT

A pad for supporting heavy equipment is disclosed, which is composed of a lightweight material to facilitate transportation and installation of the pad. The lighweight pad's ability to support large weights is enhanced through its use of a multiplicity of sidewalls distributed beneath the top of the pad. The sidewalls are connected by multiple ribs, a fraction of the height of the sidewalls, to further increase the rigidity of the structure. The pad is capable of receiving hollow blocks which increase the support capabilities of the structure without adding considerable weight.

9 Claims, 1 Drawing Sheet

LOAD SUPPORTING PAD

BACKGROUND OF THE INVENTION

1. Field of the Invention

This invention relates to load-supporting pads for heavy loads such as air conditioners and other heavy equipment.

2. Description of Related Art

Previously, air conditioners and other industrial temperature-control devices have been installed directly on the ground or the roof of a building. This arrangement has been unsatisfactory in numerous instances due to vibration and the potential for damage to the equipment.

To protect the equipment, it is well-known in the art to elevate the equipment above the ground or other support surface, often on a plurality of prefabricated elongated concrete blocks such as those used as parking curbs in parking lots. Although providing the desired elevation and insulation from the ground, these blocks typically do not provide uniform support for the equipment and may cause structural damage by allowing the equipment to sag where unsupported. Furthermore, such blocks because of their extreme weight can be very difficult to install and may be impractical for some roof top installations.

Another approach has been to place the load on a concrete pad. Such an arrangement does provide elevation and uniform support. Concrete pads are, however, like concrete blocks, extremely heavy, and expensive. In addition concrete pads are typically custom built and therefore are labor intensive and time-consuming.

To provide some standardization construction bricks have also been used for support pads. However, bricks are generally very brittle and can easily chip and shatter when stressed.

Another problem encountered when installing heavy equipment is that the underlying ground may subside, causing disruption of the horizontal alignment of the platform. It can be readily appreciated that restoring and resurfacing the ground underneath concrete pads can be quite difficult.

SUMMARY OF THE INVENTION

It is therefore an object of the present invention to provide an inexpensive load-supporting pad capable of supporting heavy loads such as air conditioners and industrial temperature control devices.

It is a further object of the present invention to provide a supporting pad that is readily transportable to the installation site and readily removable should this need arise.

These and other objectives and advantages are achieved in a pad which in the illustrated embodiment includes a one-piece molded body having a generally flat top and orthogonal downward projecting walls. The walls are integrally connected to each other and the top to provide the necessary structural reinforcement in the underside of the platform. The entire platform is preferably constructed of a type of plastic having an exterior skin and a dense cellular foam core.

Such a pad has been found to be extremely strong yet light weight. Consequently, heavy loads such as air conditioner compressors may be securely supported off the ground. Furthermore, the pads may be inexpensively manufactured, easily transported to the installation site and readily installed.

A better understanding of the invention, along with its other attendant objects and advantages, may be had from a consideration of the following detailed description of its preferred embodiments, particularly when considered with reference to the drawings attached hereto. A brief description of these now follows:

DETAILED DESCRIPTION OF THE ILLUSTRATED EMBODIMENT

The following description is made for the purpose of illustrating the general principles of the invention and is not to be taken in a limiting sense. The scope of the invention is best determined by reference to the appended claims.

Figure 1:
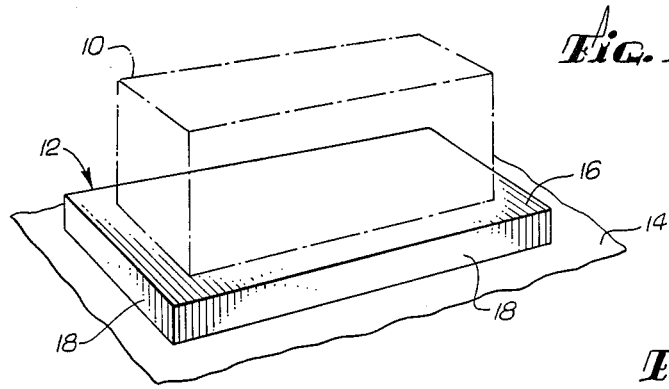
FIG. 1 is a front elevational view of a pad bearing a load.

FIG. 1 shows a load 10 being supported by a portable pad 12 in accordance with a preferred embodiment of the present invention. The pad 12 rests directly on level ground area 14 which presents a generally horizontal surface supporting the pad 12 and load 10. As shown in FIG. 1, the pad 12 elevates the load 10 with respect to the ground, protecting it from water run-off, pest infestation, etc. As will be described in greater detail below, the pad 12 provides an extremely light weight yet very strong prefabricated pad that can be readily installed at one location and moved to another location if necessary.

In one application, the load 10 represents heavy equipment such as an air conditioner. To install the air conditioner 10, the ground support area 14 is first leveled so as to present a horizontal support surface. For many soil types, the load supporting pad 12 may be placed directly on the ground 14 without first packing the soil. Then, the air conditioner 10 is simply lowered on top of the pad 12. Thus, the present invention provides a simple, cost effective, labor-conserving installation for an air conditioner that obviates the need for building a concrete pad—a process which can be time-consuming and expensive.

Figure 2:
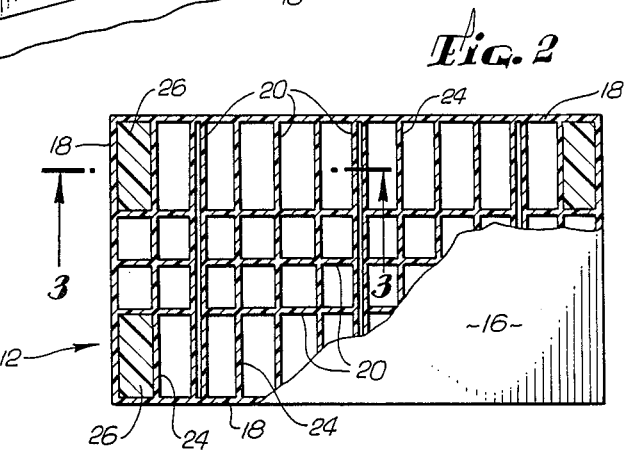
FIG. 2 is a top view of a pad in accordance with a preferred embodiment of the present invention, shown with a portion broken away.
Figure 3:
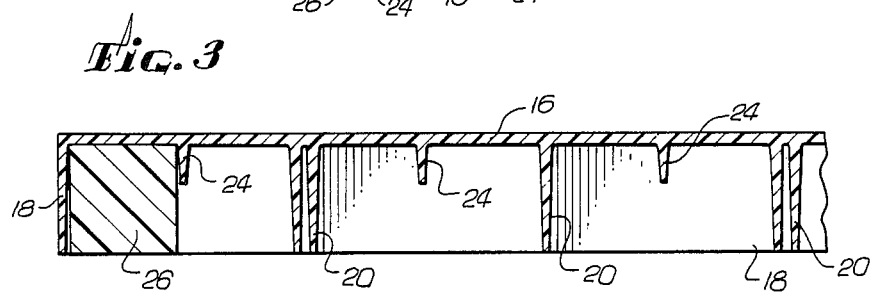
FIG. 3 is a cross-sectional view of the pad of FIG. 2 along the lines 3—3.
Figure 4:
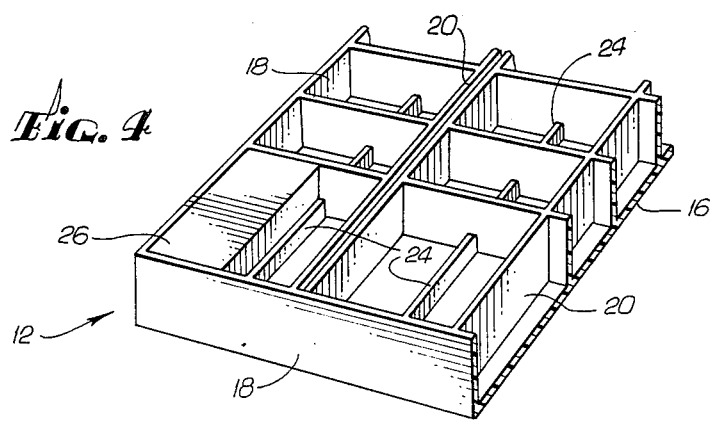
FIG. 4 is a perspective view of a footing block of the pad of FIG. 2.

Referring to now FIGS. 2-4, the pad 12 is shown to have a generally rectangular flat top which is in direct contact with the load and distributes the weight of its load over the area of the pad 12. Upstanding integral walls 18 are situated along the perimeter of the flat top 16. The perimeter walls 18 are orthogonal to the flat top 16 and give the pad 12 the external appearance of a box lid. The walls 18, however, do not need to be flush with the edge of the top 16. It is recognized that the top 16 may be formed so as to overhang the perimeter walls 18.

Within the area defined by the perimeter walls 18 are a plurality of integral interior walls 20, walls which are also orthogonal to the flat top 16. The walls 20 are situated at regular intervals and are generally of the same height as the perimeter walls 18. In the preferred embodiment, the interior walls 20 intersect each other at right angles to form a grid. Thus, some of the walls 20 are parallel to the width of the flat top 16 and some of the walls 20 are parallel to the length of said flat top 16. The walls 18 and 20 interconnected in this manner maintain the rigidity of the structure and prevent deformation of the flat top and the walls themselves.

By virtue of being generally of the same height, the bottom faces of the perimeter walls 18 and the interior walls 20 function together as a support base contacting the ground. Notwithstanding the fact that the total area of the bottom faces of the upstanding walls is a small fraction of the area of the top 16, it has been found that the pad 12 settles into the ground to a remarkably small degree, even with a load in excess of 500 pounds. Moreover, the settling that does occur further assists in "locking" the pad 12 in place to resist lateral movement.

As previously mentioned, the strength of the pad 12 is enhanced by the interconnection of the walls. As a result, the individual walls in the illustrated embodiment can be relatively thin, contributing to the light weight of the device. The height of the walls is preferably between 1" and 10". Although this is not limitative, a higher structure may require extra reinforcement.

Interspersed between the interior walls 20 is a plurality of strengthening ribs 24. The strengthening ribs 24 are of lesser height than the interior walls 20. Thus, when the pad 12 is in position, the strengthening ribs do not contact the ground. The strengthening ribs 24 add to the rigidity of the structure by providing support to the flat top and further interconnect the interior walls 20. The combination of ribs and walls result in a "honeycomb" like structure that is highly compression resistant, thereby being able to bear relatively heavy loads.

Due to the structural stability and strength of the honeycomb-like structure, the pad can be made of light material such as high-density polyethylene. Other types of plastic can also be used, with the preferable type having a exterior skin and a cellular foam core. This type of structure has the high deformation and stress resistance desired for this type of device while maintaining a low weight. The use of high strength plastic represents a great improvement in terms of weight, movability, and cost. As a result of the material, the width of the ribs and walls can be maintained at less than 1".

One representative embodiment of the invention has a flat top 16 measuring 24"×42". The flat top is 0.31" thick. The perimeter walls 18 are of 3" height and 0.25" thickness. The interior walls 20 are 3" high and 0.19" thick and spaced at approximately 6" intervals in a parallel direction to the width of the flat top. Along the length of the flat top, the walls 20 occur at the midpoint and at intervals of 4" on each side of the center. Strengthening ribs 24 of 0.25" thickness occur at the midspan of the walls 20, running parallel with the width of the flat top 16. The embodiment is manufactured using High Density Polyethylene pellets, preferably those marketed under the trademarks "Hostalen", "Hostalen PP" and "Hostalen LD."

To add to the strength of the structures, footing blocks 26 can also be provided. As shown in FIG. 4, the illustrated footing blocks are generally rectangular in shape and are adapted to be received in a corner cell of the pad grid. Like the pad itself, the blocks 26 are made of molded plastic and may be solid or hollow, depending upon the application. The blocks further strengthen the pad and are recommended for extremely heavy loads.

It is to be understood that the invention is not to be limited by the specific illustrated embodiments but only by the scope of the appended claims.

I claim:

1. A pad for supporting heavy equipment, comprising:
   a one-piece molded body having a generally flat top and a plurality of upstanding support walls integral with the top;
   said support walls including a plurality of sidewalls formed along the perimeter of the top and defining and substantially enclosing and interior area, and a plurality of interior support walls traversing the interior area in an intersecting pattern forming a support grid;
   a plurality of support ribs, of substantially lesser height than said support walls and integral with and orthogonal to the top, traversing the interior area at predetermined intervals to junction for support with preselected ones of the support walls to subdivide the support grid for better support to the top.

2. The pad of claim 1 wherein the top and the support walls define a plurality of cells subdivided by the support ribs, said pad further comprising a plurality of blocks, each block being adapted to be matingly received by a subdivision of a cell.

3. The pad of claim 1 wherein the top is generally flat and the walls are generally orthogonal to define an intersecting grid of walls supporting the top.

4. The pad of claim 1 wherein the walls have a height of at least two inches.

5. A load supporting pad comprising:
   a generally flat top having top and bottom sheet faces;
   generally orthogonal exterior support walls joined to the bottom sheet face;
   orthogonal downwardly extending interior support walls, of the same height as the exterior support walls and joined to the bottom sheet face, intersecting the exterior support walls and each other to form a support grid; and
   a plurality of support ribs of substantially lesser height than the exterior and interior support walls and integral with the bottom sheet face and traversing the bottom sheet face and the support grid at predetermined intervals to subdivide the support grid for better support of any load bearing on the flat top.

6. The load supporting pad of claim 5 wherein the flat top and the support walls are made of a material comprising an exterior skin and a dense cellular foam core.

7. The load supporting pad of claim 6 wherein the material is high density polyethylene.

8. The load supporting pad of claim 5 further comprising reinforcing blocks, each block abutting a support rib and three of the support walls.

9. The load supporting pad of claim 8 wherein the blocks are positioned at the corners of the pad.

* * * * *